US012695821B2

(12) United States Patent
Lee et al.

(10) Patent No.: US 12,695,821 B2
(45) Date of Patent: Jul. 28, 2026

(54) ELECTRONIC DEVICE COMPRISING DISPLAY SUPPORT MODULE

(71) Applicant: Samsung Electronics Co., Ltd., Suwon-si (KR)

(72) Inventors: Kyungrok Lee, Suwon-si (KR); Hongseok Kim, Suwon-si (KR); Yongsang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 18/640,732

(22) Filed: Apr. 19, 2024

(65) Prior Publication Data

US 2024/0267442 A1      Aug. 8, 2024

Related U.S. Application Data

(63) Continuation of application No. PCT/KR2022/014576, filed on Sep. 28, 2022.

(30) Foreign Application Priority Data

Oct. 25, 2021      (KR) ........................ 10-2021-0142546

(51) Int. Cl.
  H04M 1/00      (2006.01)
  G06F 1/16      (2006.01)
  H04M 1/02      (2006.01)

(52) U.S. Cl.
  CPC .................................. H04M 1/022 (2013.01)

(58) Field of Classification Search
  CPC ...... H04M 1/022; H04M 1/02; H04M 1/0268; G06F 1/1641; G06F 1/1652; G06F 1/1681; G06F 1/1616; G06F 1/1628
  See application file for complete search history.

(56) References Cited

U.S. PATENT DOCUMENTS 9,829,924 B2 * 11/2017 Shin ...................... G06F 1/1656
9,927,841 B2 * 3/2018 Gheorghiu .......... E05D 11/0054
(Continued)

FOREIGN PATENT DOCUMENTS

CN      213270695 U      5/2021
CN      113374778 A      9/2021
(Continued)

OTHER PUBLICATIONS

International Search Report and written opinion dated Dec. 29, 2022, issued in International Application No. PCT/KR2022/014576.

(Continued)

*Primary Examiner* — Rockshana D Chowdhury
(74) *Attorney, Agent, or Firm* — Jefferson IP Law, LLP

(57)      ABSTRACT

An electronic device is provided. The electronic device includes a housing comprising a first housing and a second housing, a display including a first display area connected to the first housing, a second display area connected to the second housing, and a folding area located between the first display area and the second display area, a hinge connected to the first housing and the second housing, and a display support connected to the hinge and being configured to rotate based on a rotation of the hinge. The display support comprises a gear assembly connected to the hinge, a case structure including a first area, a second area, and a third area, the first area being connected to the gear assembly, the second area extending from the first area in a first direction and including a first support surface configured to face the folding area in an unfolded state of the electronic device, the third area extending from the first area in a second direction different from the first direction and including a second support surface configured to face the folding area in a folded state of the electronic device, and a deformable (Continued)

member disposed on the third area and being configured to contact the folding area.

15 Claims, 15 Drawing Sheets

(56) References Cited

U.S. PATENT DOCUMENTS

| | | | | |
|---|---|---|---|---|
| 10,423,019 | B1 * | 9/2019 | Song | G06F 1/1652 |
| 10,520,992 | B1 * | 12/2019 | Chang | H05K 5/0226 |
| 11,194,366 | B2 * | 12/2021 | Cheng | G06F 1/1626 |
| 11,266,030 | B2 * | 3/2022 | Kim | H05K 5/0226 |
| 11,455,017 | B2 * | 9/2022 | Liu | G06F 1/1626 |
| 11,467,633 | B2 * | 10/2022 | Liao | G06F 1/1641 |
| 11,550,358 | B2 * | 1/2023 | Cheng | H04M 1/022 |
| 11,778,764 | B2 * | 10/2023 | Zhang | H05K 5/0226 |
| | | | | 361/807 |
| 11,846,998 | B2 * | 12/2023 | Wu | H05K 5/0226 |
| 11,889,007 | B2 * | 1/2024 | Kim | G06F 1/1681 |
| 12,079,047 | B2 * | 9/2024 | Hsu | F16C 11/04 |
| 12,082,359 | B2 * | 9/2024 | Wang | G06F 1/1681 |
| 12,130,668 | B2 * | 10/2024 | Liu | G09F 9/301 |
| 2015/0233162 | A1 | 8/2015 | Lee et al. | |
| 2019/0278338 | A1 * | 9/2019 | Siddiqui | G06F 1/1656 |
| 2020/0249717 | A1 * | 8/2020 | Shibayama | G06F 1/1652 |
| 2020/0348732 | A1 | 11/2020 | Kang et al. | |
| 2020/0363843 | A1 * | 11/2020 | Cheng | G06F 1/1681 |
| 2021/0034116 | A1 | 2/2021 | Torres et al. | |
| 2021/0044682 | A1 | 2/2021 | Liu et al. | |
| 2021/0165466 | A1 | 6/2021 | Kang et al. | |
| 2023/0195180 | A1 | 6/2023 | Park et al. | |
| 2023/0236635 | A1 | 7/2023 | Liu | |

FOREIGN PATENT DOCUMENTS

| | | | |
|---|---|---|---|
| JP | 2021-033192 | A | 3/2021 |
| JP | 2021-513237 | A | 5/2021 |
| KR | 10-2016-0121350 | A | 10/2016 |
| KR | 10-1875855 | B1 | 7/2018 |
| KR | 10-2020-0117773 | A | 10/2020 |
| KR | 10-2020-0117777 | A | 10/2020 |
| KR | 10-2020-0126524 | A | 11/2020 |
| KR | 10-2020-0137948 | A | 12/2020 |
| KR | 10-2186343 | B1 | 12/2020 |
| KR | 10-2021-0068880 | A | 6/2021 |
| KR | 10-2021-0127394 | A | 10/2021 |
| WO | 2021/194595 | A1 | 9/2021 |

OTHER PUBLICATIONS

Extended European Search Report dated Feb. 11, 2025, issued in European Application No. 22887386.5-1218.
Korean Office Action with English translation dated Dec. 22, 2025; Korean Appln. No. 10-2021-0142546.

* cited by examiner

100

181  183  170
182  172  174  140

110

180

Ax1
Ax2

120

180-1        180-2

180

ELECTRONIC DEVICE COMPRISING DISPLAY SUPPORT MODULE

CROSS-REFERENCE TO RELATED APPLICATION(S)

This application is a continuation application, claiming priority under § 365(c), of an International application No. PCT/KR2022/014576, filed on Sep. 28, 2022, which is based on and claims the benefit of a Korean patent application number 10-2021-0142546, filed on Oct. 25, 2021, in the Korean Intellectual Property Office, the disclosure of which is incorporated by reference herein in its entirety.

BACKGROUND

1. Field

The disclosure relates to an electronic device including a display support module.

2. Description of Related Art

The development of information and communication technology and semiconductor technology has led to the integration of various functions into a single portable electronic device. For example, electronic devices may implement not only communication functions, but also entertainment functions such as games, multimedia functions such as music and video playback, communication and security functions for mobile banking, calendar management, and electronic wallet functions. These electronic devices are being miniaturized so that they may be conveniently carried by users. As mobile communication services are expanded to include multimedia services, there is a need to increase the size of the display of an electronic device in order for a user to fully use multimedia services as well as voice calls and short messages. However, the size of the display of an electronic device is in a trade-off relationship with the miniaturization of the electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device including a display support module.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first housing and a second housing, a display including a first display area connected to the first housing, a second display area connected to the second housing, and a folding area located between the first display area and the second display area, a hinge connected to the first housing and the second housing, and a display support connected to the hinge and being configured to rotate based on a rotation of the hinge. The display support comprises a gear assembly connected to the hinge, a case structure including a first area, a second area, and a third area, the first area being connected to the gear assembly, the second area extending from the first area in a first direction and including a first support surface configured to face the folding area in an unfolded state of the electronic device, the third area extending from the first area in a second direction different from the first direction and including a second support surface configured to face the folding area in a folded state of the electronic device, and a deformation member disposed on the third area and being configured to contact the folding area.

In accordance with another aspect of the disclosure, an electronic device is provided. The electronic device includes a housing including a first housing and a second housing, a display including a first display area connected to the first housing, a second display area connected to the second housing, and a folding area located between the first display area and the second display area, a hinge connected to the first housing and the second housing, and a display support connected to the hinge and being configured to rotate based on a rotation of the hinge. The display support comprises a gear assembly connected to the hinge, a case structure including a first area connected to the gear assembly, a second area extending from the first area in a first direction, and a third area extending from the first area in a second direction different from the first direction, and a deformation member disposed on the third area. The deformation member includes a cushioning member facing the folding area and a metal member disposed under the cushioning member.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
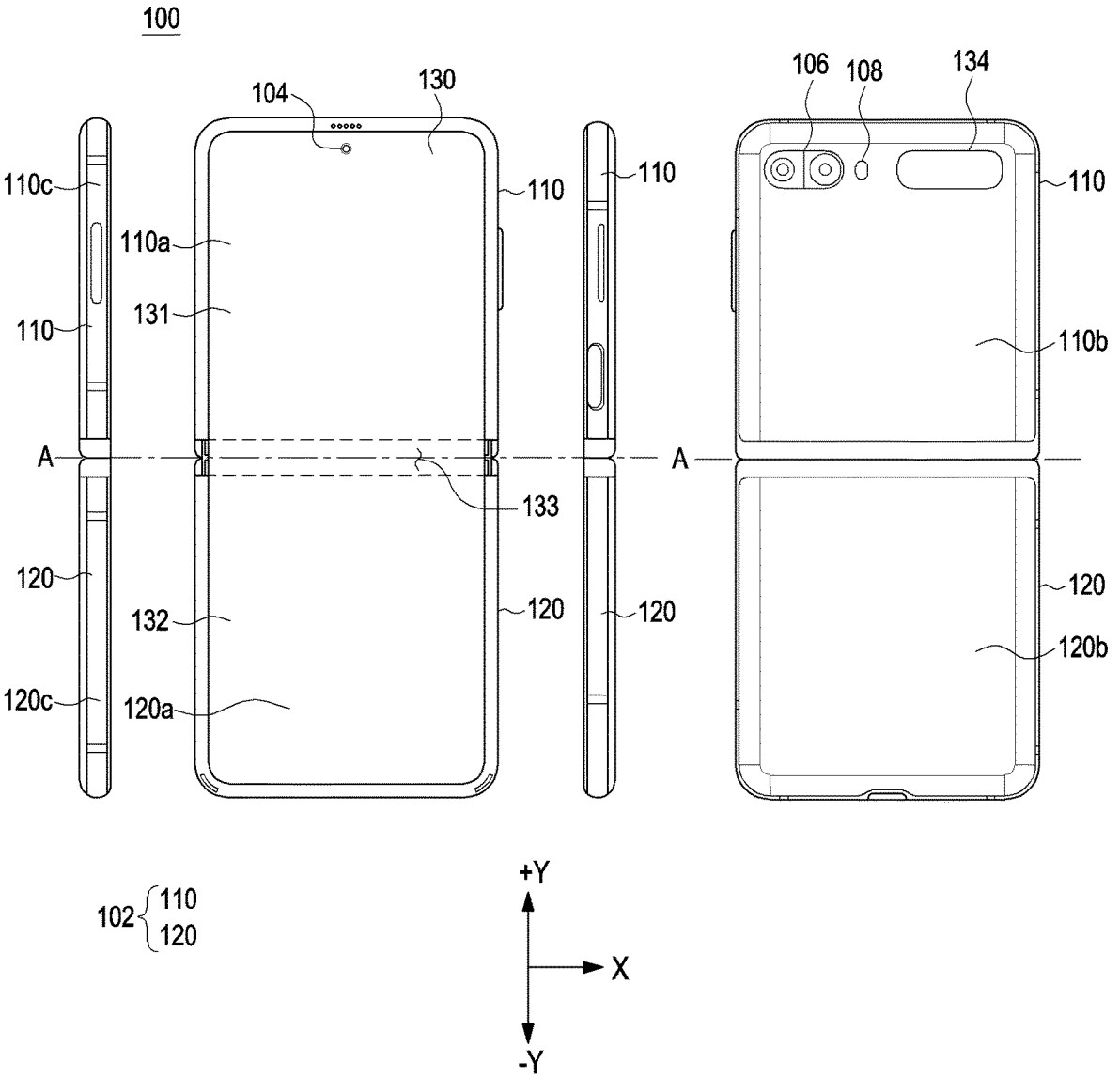
FIG. 1 is a diagram illustrating an electronic device in an unfolded state according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic device is not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1$^{st}$" and "2$^{nd}$", or "first" and "second" may be used to simply distinguish a corresponding component from another, and does not limit the components in other aspects (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

FIG. 1 is a diagram illustrating an electronic device in an unfolded state according to an embodiment of the disclosure.

Figure 2:
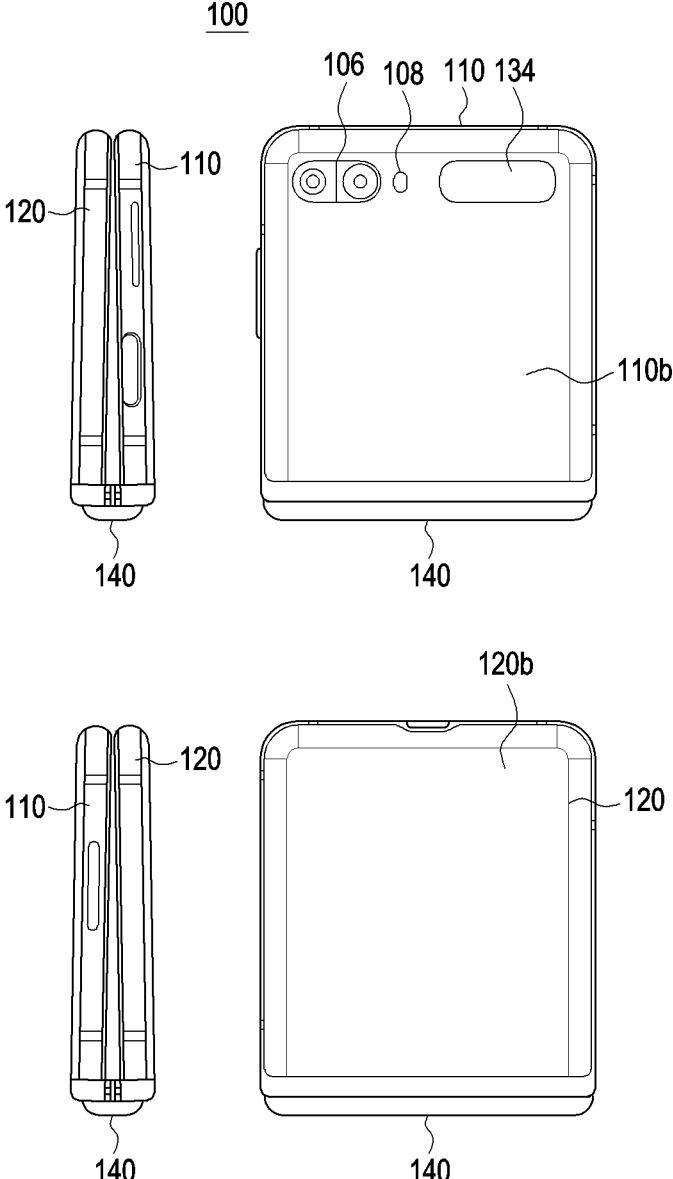
FIG. 2 is a diagram illustrating an electronic device in a folded state according to an embodiment of the disclosure.

FIG. 2 is a diagram illustrating an electronic device in a folded state according to an embodiment of the disclosure.

Referring to FIGS. 1 and 2, an electronic device 100 may include a foldable housing 102 (hereinafter, referred to as a housing 102) to accommodate components (e.g., a hinge module 180 in FIG. 3) of the electronic device 100, and a flexible or foldable display 130 (hereinafter, referred to as a display 130) disposed within a space formed by the housing 102.

According to an embodiment, the housing 102 may include a first housing 110 and a second housing 120.

According to an embodiment, the first housing 110 and/or the second housing 120 may form at least a portion of the exterior of the electronic device 100. According to an embodiment, a surface from which the display 130 is visually exposed is defined as a front surface (e.g., a first front surface 110*a* and a second front surface 120*a*) of the electronic device 100 and/or the housing 102. An opposite surface of the front surface is defined as a rear surface (e.g., a first rear surface 110*b* and a second rear surface 120*b*) of the electronic device 100. Further, a surface surrounding at least a portion of a space between the front surface and the rear surface is defined as a side surface (e.g., a first side surface 110*c* and a second side surface 120*c*) of the electronic device 100.

Figure 3:
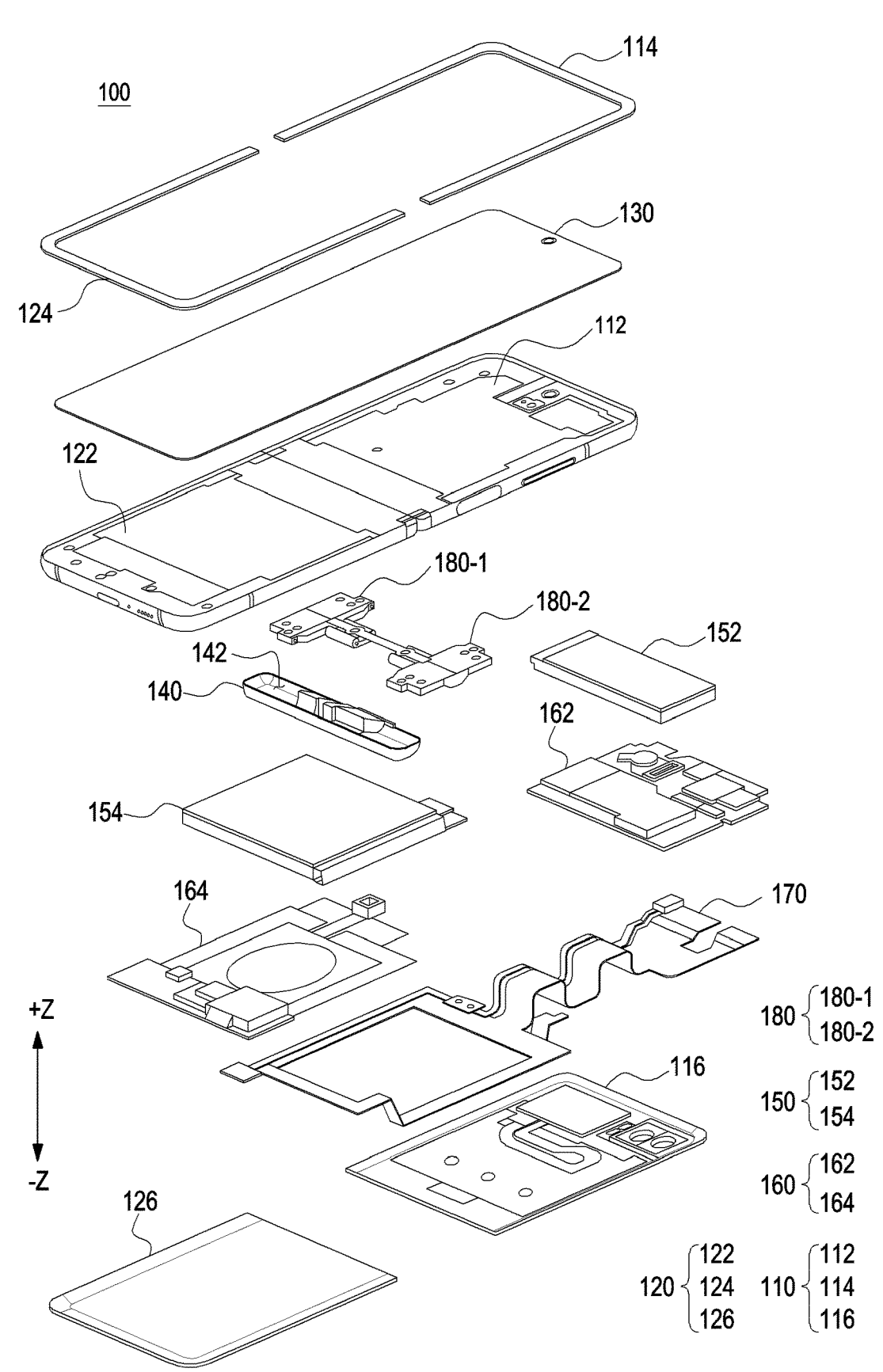
FIG. 3 is an exploded perspective view illustrating an electronic device according to an embodiment of the disclosure.

According to an embodiment, the first housing 110 may be rotatably connected to the second housing 120 using a hinge module (e.g., the hinge module 180 in FIG. 3). For example, each of the first housing 110 and the second housing 120 may be rotatably connected to the hinge module 180. Accordingly, the electronic device 100 may be changed to a folded state (e.g., FIG. 2) or an unfolded state (e.g., FIG. 1). The first front surface 110*a* may face the second front surface 120*a* in the folded state of the electronic device 100, and the first front surface 110*a* faces and the second front surface 120*a* may face in the same direction in the unfolded state of the electronic device 100. In the unfolded state, for example, the first front surface 110*a* may be located on substantially the same plane as the second front surface 120*a*. According to an embodiment, the second housing 120 may provide a relative movement with respect to the first housing 110.

According to an embodiment, the first housing 110 and the second housing 120 may be disposed on both sides of a folding axis A and have shapes which are symmetrical as a whole with respect to the folding axis A. As described later, an angle between the first housing 110 and the second housing 120 may be changed depending on whether the electronic device 100 is in the unfolded state, the folded state, or an intermediate state between the unfolded state and the folded state. According to an embodiment, the folding axis A may be an imaginary axis located between (e.g., in the middle between) a first rotation axis (e.g., a first rotation axis Ax1 in FIG. 4) and a second rotation axis (e.g., a second rotation axis Ax2 in FIG. 4).

According to an embodiment, the electronic device 100 may include a hinge cover 140. At least a portion of the hinge cover 140 may be disposed between the first housing 110 and the second housing 120. According to an embodiment, the hinge cover 140 may be covered by a portion of the first housing 110 and the second housing 120 or exposed to the outside of the electronic device 100, depending on the state of the electronic device 100. According to an embodiment, the hinge cover 140 may protect the hinge module (e.g., the hinge module 180 in FIG. 3) from impact external to the electronic device 100. According to an embodiment, the hinge cover 140 may be interpreted as a hinge housing to protect the hinge module 180.

According to an embodiment, when the electronic device 100 is in the unfolded state, the hinge cover 140 may be covered by the first housing 110 and the second housing 120 not to be exposed, as illustrated in FIG. 1. In another example, as illustrated in FIG. 2, when the electronic device 100 is in the folded state (e.g., a fully folded state), the hinge cover 140 may be exposed between the first housing 110 and the second housing 120. In another example, when the first housing 110 and the second housing 120 are in the intermediate state where they are folded with a certain angle, the hinge cover 140 may be partially exposed to the outside between the first housing 110 and the second housing 120. In this case, however, the exposed area may be less than in the fully folded state. In an embodiment, the hinge cover 140 may include a curved surface.

According to an embodiment, the display 130 may visually provide information to the outside (e.g., a user) of the electronic device 100. The display 130 may include, for example, a holographic device or a projector, and a control circuit to control a corresponding device. According to an embodiment, the display 130 may include a touch sensor configured to detect a touch or a pressure sensor configured to measure the intensity of a force generated by the touch.

According to various embodiments, the display 130 may refer to a display in which at least a partial area is transformable into a flat or curved surface. For example, the display 130 may be formed to be changed in response to a relative movement of the second housing 120 with respect to the first housing 110. According to an embodiment, the display 130 may include a folding area 133, a first display area 131 disposed on one side of the folding area 133 (e.g., above (+Y direction) the folding area 133 illustrated in FIG. 1), and a second display area 132 disposed on the other side of the folding area 133 (e.g., below (−Y direction) the folding area 133 illustrated in FIG. 1). According to an embodiment, the folding area 133 may be located on the hinge module (e.g., the hinge module 180 in FIG. 3). According to an embodiment, the first display area 131 may be disposed on the first housing 110, and the second display area 132 may be disposed on the second housing 120. According to an embodiment, the display 130 may be accommodated in the first housing 110 and the second housing 120.

However, the division of areas of the display 130 illustrated in FIG. 1 is exemplary, and the display 130 may be divided into a plurality of areas (e.g., four or more areas or two areas) based on the structure or function thereof. For example, in the embodiment illustrated in FIG. 1, the areas of the display 130 may be defined by the folding area 133 extending in parallel to an X axis or the folding axis A. However, in another embodiment, the display 130 may be divided into areas based on a different folding area (e.g., a folding area parallel to a Y axis) or a different folding axis (e.g., a folding axis parallel to the Y axis). According to an embodiment, the display 130 may be coupled to or disposed adjacent to a touch sensing circuit, a pressure sensor capable of measuring the intensity (pressure) of a touch, and/or a digitizer configured to detect a magnetic stylus pen.

According to an embodiment, the electronic device 100 may include a rear display 134. The rear display 134 may be disposed to face in a different direction from the display 130. For example, the display 130 may be visually exposed through the front surface (e.g., the first front surface 110*a* and/or the second front surface 120*a*) of the electronic device 100, and the rear display 134 may be visually exposed through the rear surface (e.g., the first rear surface 110*b*) of the electronic device 100.

According to an embodiment, the electronic device 100 may include at least one camera 104 and 106 and a flash 108. According to an embodiment, the electronic device 100 may include a front camera 104 exposed through the front surface (e.g., the first front surface 110*a*) and/or a rear camera 106 exposed through the rear surface (e.g., the first rear surface 110*b*). The cameras 104 and 106 may include one or more lenses, an image sensor, a flash, and/or an image signal processor. The flash 108 may include, for example, a light emitting diode (LED) or a xenon lamp. In some embodiments, two or more lenses (an infrared (IR) camera, a wide-angle lens, and a telephoto lens) and image sensors may be disposed on one surface of the electronic device 100.

FIG. 3 is an exploded perspective view illustrating an electronic device according to an embodiment of the disclosure.

Figure 4:
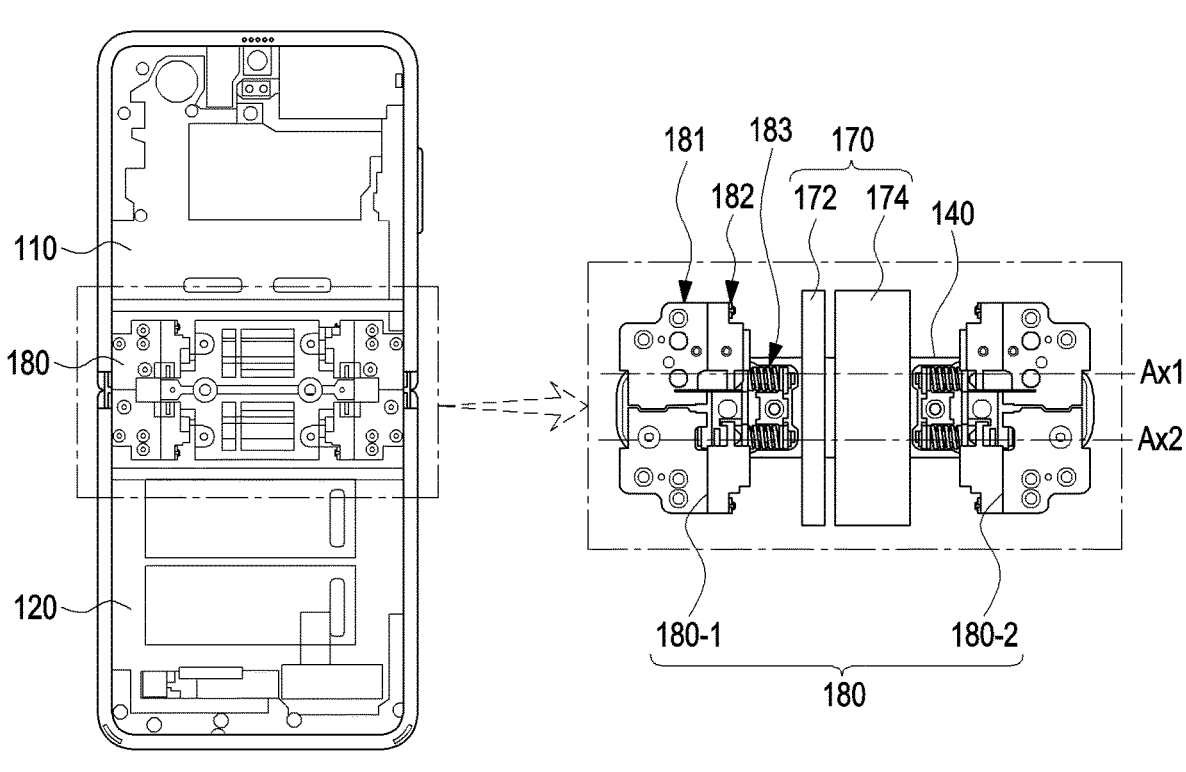
FIG. 4 is a front view illustrating an electronic device with a display removed therefrom according to an embodiment of the disclosure.
Figure 4:
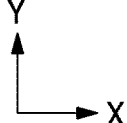

FIG. 4 is a front view illustrating an electronic device with a display removed therefrom according to an embodiment of the disclosure.

Referring to FIGS. 3 and 4, an electronic device 100 may include a first housing 110, a second housing 120, a display 130, a hinge cover 140, a battery 150, a printed circuit board (PCB) 160, a flexible printed circuit board (FPCB) 170, and a hinge module 180. The configurations of the first housing 110, the second housing 120, the display 130, and the hinge cover 140 in FIGS. 3 and 4 may be wholly or partially the same as those of the first housing 110, the second housing 120, the display 130, and the hinge cover 140 in FIGS. 1 and 2.

According to an embodiment, the housings 110 and 120 may include a first support member 112 and a second support member 122. For example, the first housing 110 may include the first support member 112, and the second housing 120 may include the second support member 122. According to an embodiment, the first support member 112 and/or the second support member 122 may support components (e.g., the display 130, the battery 150, and the PCB 160) of the electronic device 100.

According to an embodiment, the first support member 112 and/or the second support member 122 may be formed of a metallic material and/or a non-metallic (e.g., polymer) material. According to an embodiment, the first support member 112 may be disposed between the display 130 and the battery 150. For example, the display 130 may be coupled to one surface of the first support member 112, and the battery 150 and the PCB 160 may be disposed on the other surface of the first support member 112.

According to an embodiment, the housings 110 and 120 may include a first decorative member 114 and a second decorative member 124. For example, the first housing 110 may include the first decorative member 114, and the second housing 120 may include the second decorative member 124. According to an embodiment, the decorative members 114 and 124 may protect the display 130 from external impact. For example, the first decorative member 114 may at least partially surround a portion (e.g., the first display area 131 in FIG. 1) of the display 130, and the second decorative member 124 may at least partially surround another portion (e.g., the second display area 132 in FIG. 1) of the display 130. According to an embodiment, the first decorative member 114 may be interpreted as a first protective member, and the second decorative member 124 may be interpreted as a second protective member.

According to an embodiment, the housings 110 and 120 may include a first rear plate 116 and a second rear plate 126. For example, the first housing 110 may include the first rear plate 116 connected to the first support member 112, and the second housing 120 may include the second rear plate 126 connected to the second support member 122. According to an embodiment, the rear plates 116 and 126 may form a portion of the exterior of the electronic device 100. For example, the first rear plate 116 may form the first rear surface (e.g., the first rear surface 110*b* in FIG. 1) and the second rear plate 126 may form the second rear surface (e.g., the second rear surface 120*b* in FIG. 1). According to an embodiment, a first battery 152 and a first PCB 162 may be disposed between the first support member 112 and the first rear plate 116, and a second battery 154 and a second PCB 164 may be disposed between the second support member 122 and the second rear plate 126.

According to an embodiment, the hinge cover 140 may accommodate at least a portion of the hinge module 180. For example, the hinge cover 140 may include an accommodation recess 142 to accommodate the hinge module 180 therein. According to an embodiment, the hinge cover 140 may be coupled to the hinge module 180. According to an embodiment, when the electronic device 100 is in the unfolded state, at least a portion of the hinge cover 140 may be located between the hinge module 180 and the housings 110 and 120.

According to an embodiment, the battery 150, which is a device to supply power to at least one component of the electronic device 100, may include a non-rechargeable primary cell, a rechargeable secondary cell, or a fuel cell. The battery 150 may be disposed integrally within the electronic device 100 or detachably from the electronic device 100. According to an embodiment, the battery 150 may include the first battery 152 disposed within the first housing 110 and the second battery 154 disposed within the second housing 120. For example, the first battery 152 may be disposed on the first support member 112, and the second battery 154 may be disposed on the second support member 122.

According to an embodiment, a processor, memory, and/or an interface may be mounted on the PCB 160. The processor may include, for example, at least one of a central processing unit (CPU), an application processor, a graphics processing unit, an image signal processor, a sensor hub processor, or a communication processor. The memory may include, for example, volatile memory or non-volatile memory. The interface may include, for example, a high definition multimedia interface (HDMI), a universal serial bus (USB) interface, a secure digital (SD) card interface, and/or an audio interface. The interface may electrically or physically connect the electronic device 100 to an external electronic device, for example, and include a USB connector, an SD card/multimedia card (MMC) connector, or an audio connector. According to an embodiment, the PCB 160 may include the first PCB 162 disposed within the first housing 110 and the second PCB 164 disposed within the second housing 120.

According to an embodiment, the FPCB 170 may electrically connect a component (e.g., the first PCB 162) located in the first housing 110 to a component (e.g., the second PCB 164) located in the second housing 120. According to an embodiment, at least a portion of the FPCB 170 may cross the hinge cover 140 and/or the hinge module 180. For example, a portion of the FPCB 170 may be disposed within the first housing 110, and another portion thereof may be disposed within the second housing 120. According to an embodiment, the FPCB 170 may include a first FPCB 172 connected to an antenna and a second FPCB 174 connected to the display 130.

According to an embodiment, the hinge module 180 may be connected to the first housing 110 and the second housing 120. For example, the hinge module 180 may include a first rotation member 181*a* connected or coupled to the first support member 112 of the first housing 110 and a second rotation member 181*b* connected or coupled to the second support member 122 of the second housing 120. According to an embodiment, the first housing 110 may rotate with respect to the second housing 120 using the hinge module 180. For example, the first housing 110 and/or the first rotation member 181*a* may rotate around the first rotation axis Ax1, and the second housing 120 and/or the second rotation member 181*b* may rotate around the second rotation axis Ax2. According to an embodiment, the hinge module 180 may connect the first housing 110 and the second housing 120 to be rotatable from the folded state (e.g., FIG. 2) to the unfolded state (e.g., FIG. 1). According to an embodiment, the hinge module 180 may be disposed between the housing 102 and the display 130. According to an embodiment, the second rotation axis Ax2 may be arranged substantially parallel to the first rotation axis Ax1.

According to an embodiment, the hinge module 180 may include a rotation structure 181, an interlocking structure 182, and/or a fixing structure 183.

According to an embodiment, the rotation structure 181 may substantially implement or guide a rotational motion of the first housing 110 and/or the second housing 120. According to an embodiment, the rotation structure 181 may provide the first rotation axis Ax1 and the second rotation axis Ax2. According to an embodiment, the rotation structure 181 may be connected to the first support member 112 of the first housing 110 and the second support member 122 of the second housing 120. The rotation structure 181 may include the first rotation member 181*a* and the second rotation member 181*b*.

According to an embodiment, the interlocking structure 182 may interlock rotation of the first housing 110 with rotation of the second housing 120. According to an embodiment, the interlocking structure 182 may transmit at least a portion of a force applied to the first housing 110 to the second housing 120 or transmit at least a portion of a force applied to the second housing 120 to the first housing 110. For example, the interlocking structure 182 may rotate the second housing 120 by an angle substantially equal to an angle by which the first housing 110 has rotated, using gear members (e.g., interlocking gears 182*a*, 182*b*, and 182*c* in FIG. 5).

According to an embodiment, the fixing structure 183 may position the first housing 110 and the second housing 120 at a certain angle. For example, the fixing structure 183 may prevent or reduce movement and/or rotation of the first housing 110 and/or the second housing 120 of the electronic device 100 by providing pressure to the rotation structure 181 and/or the interlocking structure 182. For example, when the user applies an external force equal to or greater than a predetermined value, the hinge module 180 may allow rotation of the first housing 110 and/or the second housing 120, and when the user applies no external force or an external force less than the predetermined value, the hinge module 180 may keep the first housing 110 and/or the second housing 120 in a stationary state using the fixing structure 183. According to an embodiment, the fixing structure 183 may include at least one elastic member 183*a* to provide pressure to the rotation structure 181 and/or the interlocking structure 182.

According to an embodiment, the hinge module 180 may include a plurality of hinge modules 180-1 and 180-2 arranged in parallel. For example, the hinge module 180 may include a first hinge module 180-1 and a second hinge module 180-2 facing the first hinge module 180-1, which are disposed on the hinge cover 140. According to an embodiment, the first hinge module 180-1 may be symmetrical to the second hinge module 180-2 with respect to a longitudinal direction (e.g., a Y-axis direction) of the electronic device 100.

Figure 5:
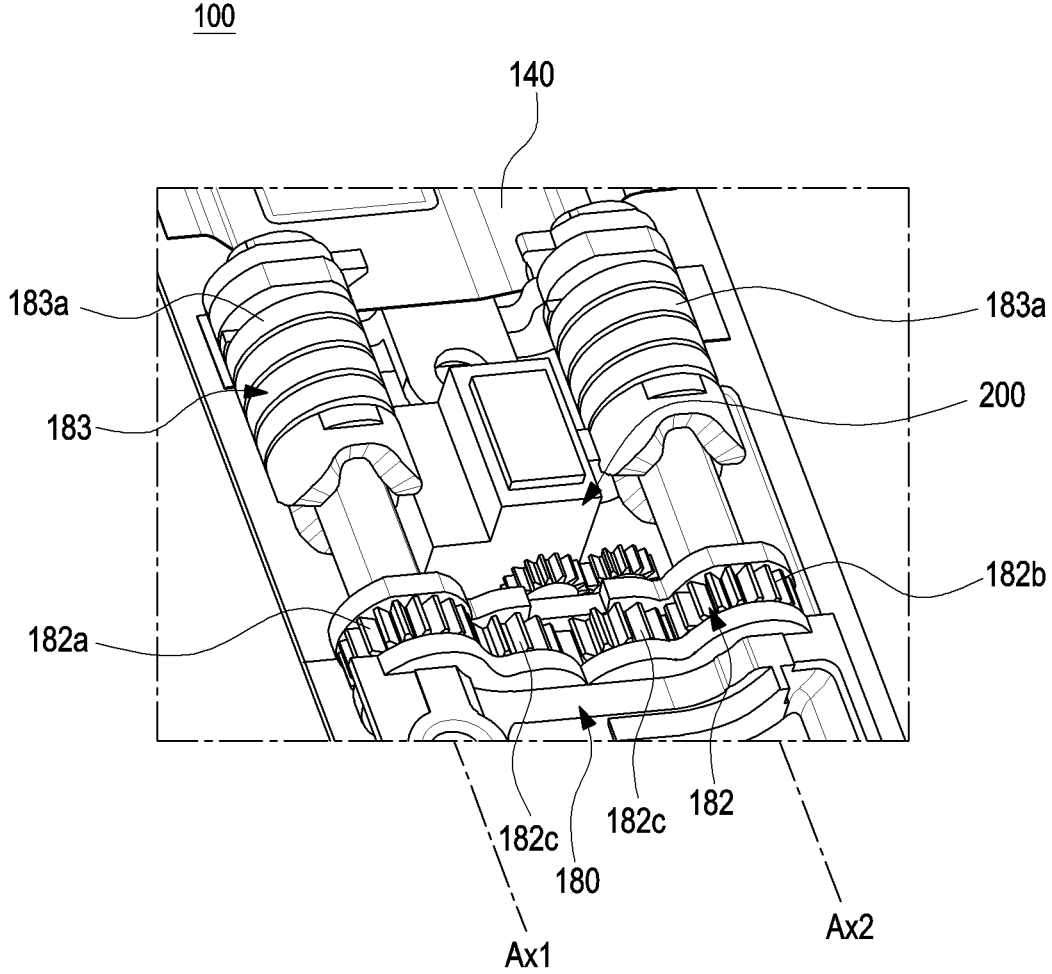
FIG. 5 is a perspective view illustrating an electronic device including a hinge module and a display support module according to an embodiment of the disclosure.

FIG. 5 is a perspective view illustrating an electronic device including a hinge module and a display support module according to an embodiment of the disclosure.

Figure 6:
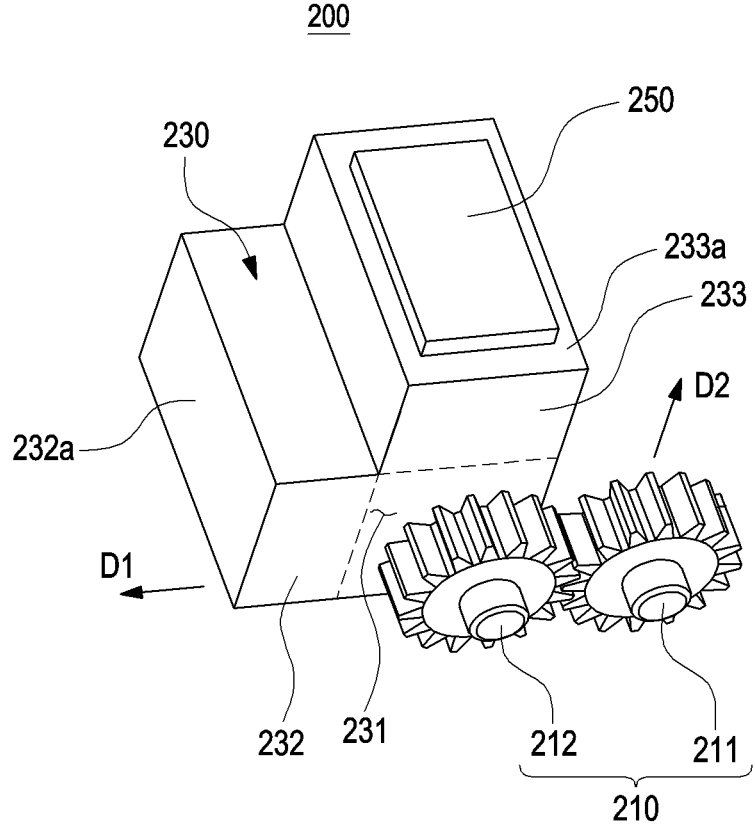
FIG. 6 is a perspective view illustrating a display support module according to an embodiment of the disclosure.

FIG. 6 is a perspective view illustrating a display support module according to an embodiment of the disclosure.

Referring to FIGS. 5 and 6, an electronic device 100 may include a hinge cover 140, a hinge module 180, and a display support module 200. The configurations of the hinge cover 140 and the hinge module 180 in FIG. 5 may be wholly or partially the same as those of the hinge cover 140 and the hinge module 180 in FIG. 3 and/or FIG. 4.

According to an embodiment, the display support module 200 may support at least a portion of the display (e.g., the display 130 in FIG. 1). For example, the display support module 200 may support the folding area (e.g., the folding area 133 in FIG. 1). According to an embodiment, the display support module 200 may be disposed between the folding area 133 of the display 130 and the hinge cover (e.g., the hinge cover 140 in FIG. 4).

According to an embodiment, the display support module 200 may include a gear assembly 210. According to an embodiment, the display support module 200 may rotate based on rotation of the hinge module 180. For example, the gear assembly 210 may be connected to the hinge module 180 and rotate based on a folding angle of the hinge module 180. According to an embodiment, the gear assembly 210 may include a first gear 211 configured to rotate based on rotation of the hinge module 180 and a second gear 212 configured to rotate based on rotation of the first gear. According to an embodiment, the first gear 211 and/or the second gear 212 may be a spur gear.

According to an embodiment, the first gear 211 may be connected to the hinge module 180. For example, the interlocking structure 182 (e.g., the interlocking structure 182 in FIG. 4) may include a first interlocking gear 182*a*, a second interlocking gear 182*b*, and a third interlocking gear 182*c* located between the first interlocking gear 182*a* and the second interlocking gear 182*b*. The third interlocking gear 182*c* may include at least one gear.

According to an embodiment, the first gear 211 may rotate based on rotation of the first interlocking gear 182*a*, the second interlocking gear 182*b*, or the third interlocking gear 182*c*. For example, the first gear 211 may rotate together with a shaft connected to the third interlocking gear 182*c*. For example, the first gear 211 may be connected to a portion of the interlocking gears 182*a*, 182*b*, and 182*c* using the shaft. According to an embodiment, the second gear 212 may be meshed with the first gear 211 and connected to a case structure 230. According to an embodiment, the second gear 212 may rotate around a direction substantially parallel to the folding axis (e.g., the folding axis A in FIG. 1) of the electronic device 100 as an axis (e.g., the X axis).

According to an embodiment, the display support module 200 may include the case structure 230. The case structure 230 may be interpreted as a case or housing that forms at least a portion of the exterior of the display support module 200. According to an embodiment, the case structure 230 may rotate based on the rotation of the hinge module 180 and/or a change in the folding angle of the electronic device 100. For example, the case structure 230 may be connected to at least a portion (e.g., the second gear 212) of the gear assembly 210 and rotate together with the second gear 212.

According to an embodiment, the case structure 230 may be formed in a shape extending in different directions with respect to the folding axis A of the electronic device 100. For example, the case structure 230 may include a first area 231 connected to the second gear 212 of the gear assembly 210, a second area 232 extending from the first area 231 in a first direction D1, and a third area 233 extending from the first area 231 in a second direction D2 different from the first direction D1.

According to an embodiment, the display support module 200 may rotate based on the rotation of the hinge module 180. According to an embodiment, when the electronic device 100 is in the unfolded state, the second area 232 may face at least a portion (e.g., the folding area 133 of FIG. 1) of the display (e.g., the display 130 in FIG. 1). According to an embodiment, when the electronic device 100 is in the folded state, the third area 233 may face the folding area 133 of the display 130. According to an embodiment, the first area 231, the second area 232, and the third area 233 may each be a portion of the case structure 230, and may be integrally formed. According to an embodiment, the case structure 230 may be formed in the shape of "⌐", to which the shape of the case structure 230 is not limited. According to an embodiment, the second area 232 may include a first support surface 232a capable of supporting at least a portion of the folding area 133 when the electronic device 100 is in the unfolded state. According to an embodiment, the third area 233 may include a second support surface 233a which partially faces the display 130 when the electronic device 100 is in the folded state. According to an embodiment, the first support surface 232a may be located at an end of the second area 232, and the second support surface 233a may be located at an end of the third area 233.

According to an embodiment, the display support module 200 may include a deformation member 250. According to an embodiment, the deformation member 250 may support at least a portion of the display 130, when the electronic device 100 is in the folded state. For example, when the electronic device 100 is in the folded state (e.g., FIG. 2), the deformation member 250 may contact the folding area 133 of the display 130. According to an embodiment, the deformation member 250 may include at least one of a cushioning member or an elastic member (e.g., cushioning member 251 in FIG. 12). For example, the deformation member 250 may be fabricated of a foam and/or rubber. According to an embodiment, the deformation member 250 may be disposed on the third area 233 of the case structure 230. According to an embodiment, the deformation member 250 may be disposed on the second support surface 233a.

According to an embodiment, at least a portion of the display support module 200 may be surrounded by the hinge module 180. For example, the display support module 200 may be located in a space between the first rotation axis Ax1 and the second rotation axis Ax2. According to an embodiment, the display support module 200 may be located between fixing structures 183.

According to an embodiment, the deformation member 250 may prevent or reduce breakage of the display 130. For example, the deformation member 250 may prevent or reduce breakage (e.g., peeling and/or cracking) of a portion of a display panel 136 (e.g., a thin film encapsulation (TFE)). According to an embodiment, when the electronic device 100 is in the folded state, the deformation member 250 may contact the display 130 and reduce the curvature of the display 130. The flexibility of the display 130 may be reduced at a low temperature (e.g., below −20° C.). A curvature at which the display 130 is deformable without breakage at the low temperature may be smaller than a curvature that the display 130 is deformable without breakage at a room temperature.

Figure 7:
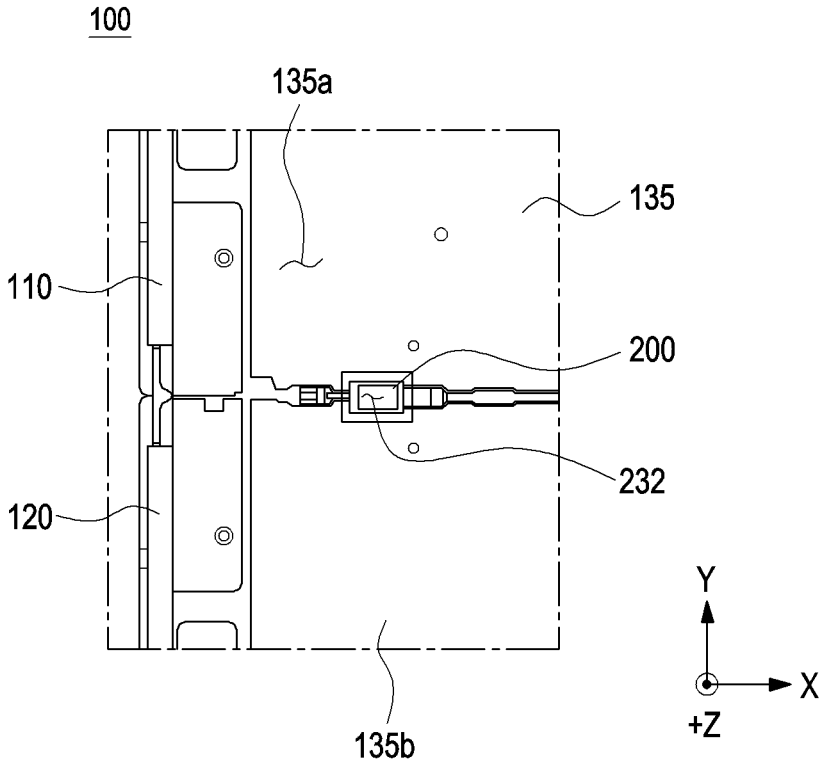
FIG. 7 is a front view illustrating an electronic device including a display support plate according to an embodiment of the disclosure.

FIG. 7 is a front view illustrating an electronic device including a display support plate according to an embodiment of the disclosure.

Figure 8:
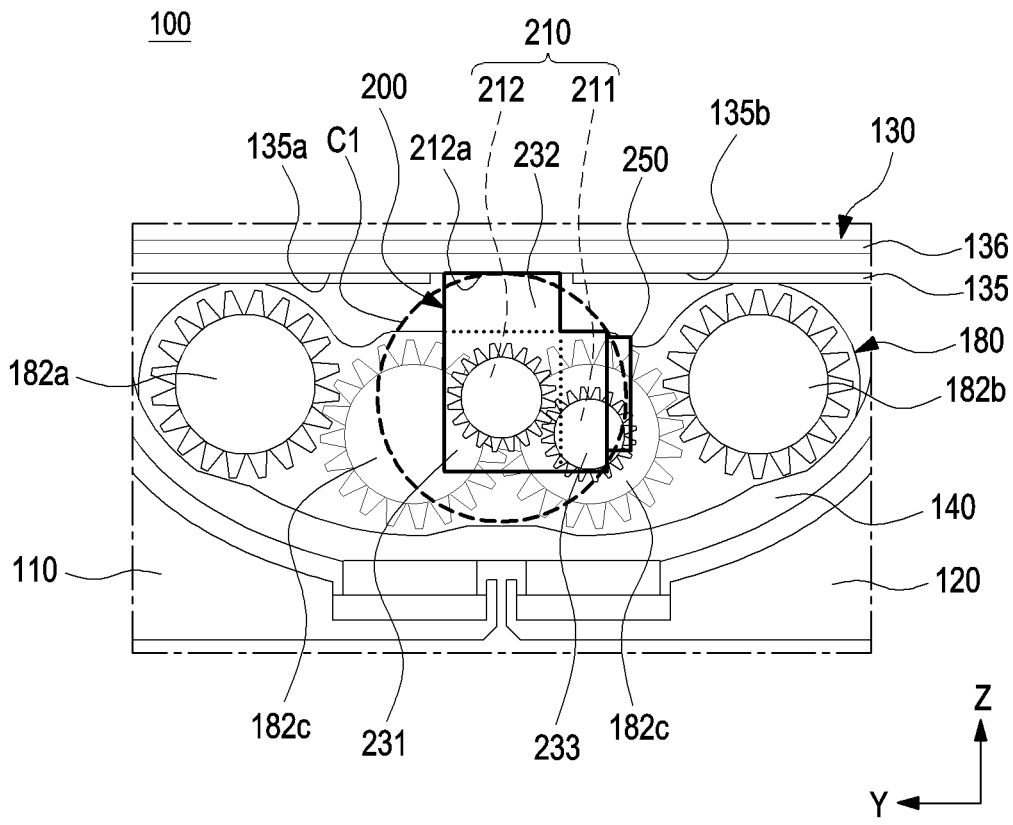
FIG. 8 is a cross-sectional view illustrating an electronic device in an unfolded state according to an embodiment of the disclosure.

FIG. 8 is a cross-sectional view illustrating an electronic device in an unfolded state according to an embodiment of the disclosure.

Figure 9:
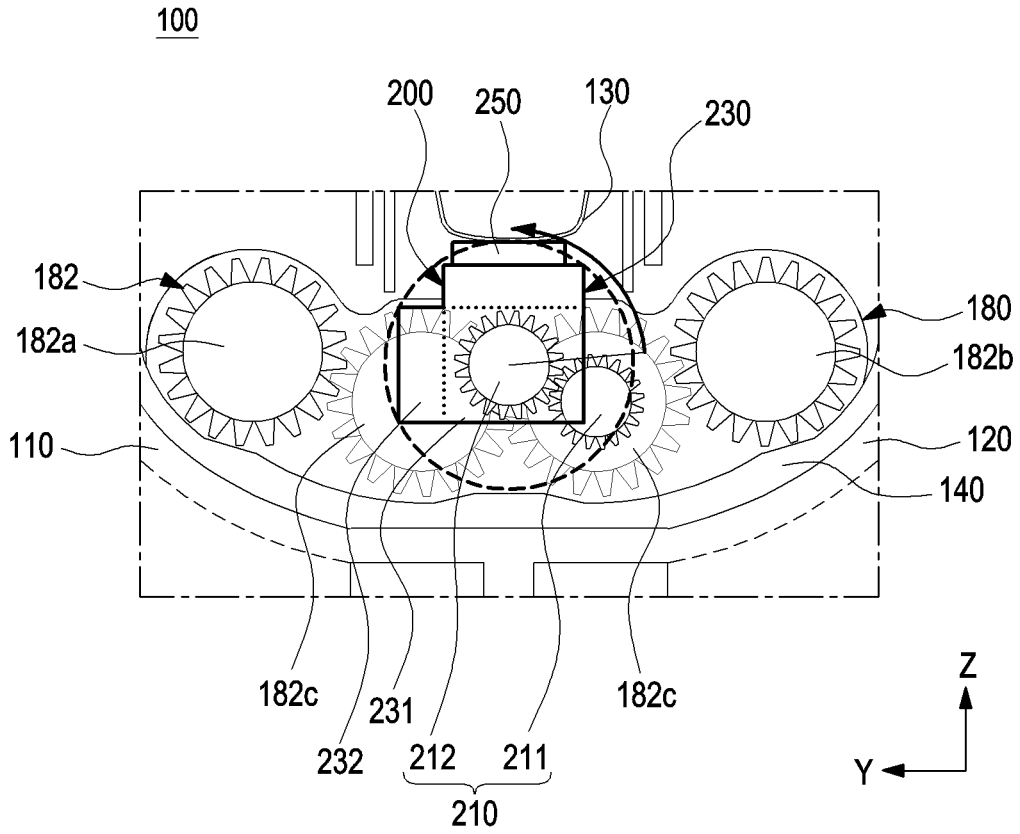
FIG. 9 is a cross-sectional view illustrating an electronic device in a folded state according to an embodiment of the disclosure.

FIG. 9 is a cross-sectional view illustrating an electronic device in a folded state according to an embodiment of the disclosure.

Referring to FIG. 7, FIG. 8, and/or FIG. 9, an electronic device 100 may include a first housing 110, a second housing 120, a display 130, a hinge cover 140, a hinge module 180, a display support module 200, and a display support plate 135. The configurations of the first housing 110, the second housing 120, the display 130, the hinge cover 140, and the hinge module 180 in FIG. 7, FIG. 8, and/or FIG. 9 may be wholly or partially the same as those of the first housing 110, the second housing 120, the display 130, the hinge cover 140, and the hinge module 180 in FIG. 3, and the configuration of the display support module 200 in FIGS. 7 to 9 may be wholly or partially the same as that of the display support module 200 in FIG. 4 and/or FIG. 5.

According to an embodiment, the electronic device 100 may include the display support plate 135 to support the display 130. According to an embodiment, the display support plate 135 may be located under the display panel 136 of the display 130. For example, at least a portion of the display support plate 135 may be disposed between the display 130 and the hinge module 180. According to an embodiment, the display support plate 135 may include a metal (e.g., stainless steel, aluminum, magnesium, and/or titanium). According to an embodiment, the display support plate 135 may include a first plate surface 135a and/or a second plate surface 135b that supports a portion (e.g., the display panel 136) of the display 130. According to an embodiment, the first support surface 232a of the second area 232 may be located substantially parallel to the first plate surface 135a and/or second plate surface 135b of the display support plate 135. For example, in the unfolded state of the electronic device 100, the first support surface 232a may be located substantially on the same plane as the first plate surface 135a and/or the second plate surface 135b. The display 130 may be supported by the first support surface 232a along with the first plate surface 135a and/or the second plate surface 135b. According to an embodiment, the first plate surface 135a may be referred to as a portion of the display support plate 135 located within the first housing 110, and the second plate surface 135b may be referred to as a portion of the display support plate 135 located within the second housing 120. According to an embodiment, the display support plate 135 may include a plurality of components which are spaced apart from each other. For example, the first plate surface 135a may be spaced apart from the second plate surface 135b.

According to an embodiment, the display support plate 135 may provide an accommodation space 135c surrounding at least a portion of the display support module 200. According to an embodiment, when the electronic device 100 is in the unfolded state (e.g., FIG. 8), the second area 232 of the display support module 200 may be located inside the accommodation space 135c, surrounded by the display support plate 135, and the first support surface 232a may face the folding area 133 of the display 130. According to an embodiment, the display support module 200 may rotate along a first trajectory C1 provided with respect to the second gear 212. The accommodation space 135*c* of the display support plate 135 may be located outside of the first trajectory C1. According to an embodiment, the accommodation space 135*c* may be a through hole formed on a single display support plate 135. According to an embodiment, the accommodation space 135*c* may be an empty space surrounded by display support plates 135 spacing apart from each other. According to an embodiment, the accommodation space 135*c* may be a groove formed into the display support plate 135. For example, the accommodation space 135*c* may be a groove of a "D" structure formed in an area where the display support module 200 is located. Although it is shown as a "D" structure in the embodiment, the groove structure is not limited to this.

According to an embodiment, the deformation member 250 may reduce or prevent breakage of the display 130. When the electronic device 100 is in the folded state (e.g., FIG. 9), the deformation member 250 may contact the display 130 and deform the display 130. For example, in the folded state of the electronic device 100, the deformation member 250 may reduce bending of the folding area 133 of the display 130. A radius of curvature of the folding area 133 provided with pressure by the deformation member 250 may be greater than a radius of curvature of a folding area in an electronic device without the deformation member 250. According to an embodiment, with the electronic device 100 folded, the third area 233 of the display support module 200 may be located within the accommodation space 135*c*.

Figure 10:
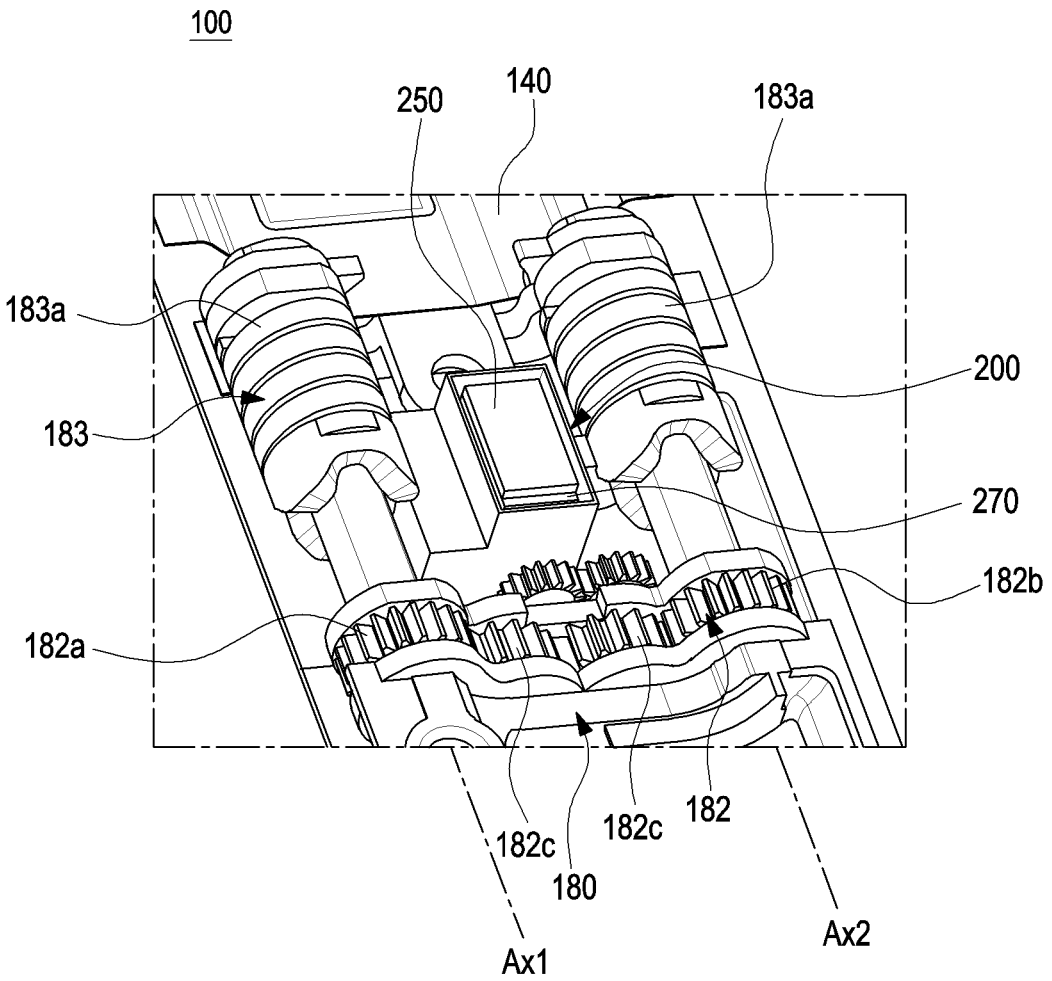
FIG. 10 is a perspective view illustrating an electronic device including a metal member according to an embodiment of the disclosure.

FIG. 10 is a perspective view illustrating an electronic device including a metal member according to an embodiment of the disclosure.

Figure 11:
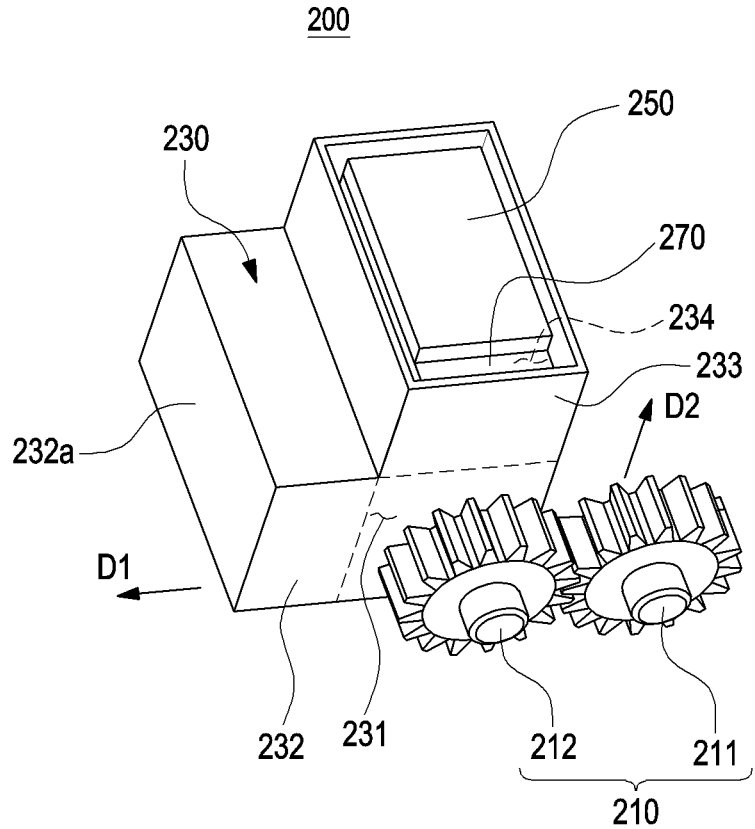
FIG. 11 is a perspective view illustrating a display support module including a metal member according to an embodiment of the disclosure.

FIG. 11 is a perspective view illustrating a display support module including a metal member according to an embodiment of the disclosure.

Referring to FIGS. 10 and 11, an electronic device 100 may include a hinge cover 140, a hinge module 180, and a display support module 200. The configurations of the hinge cover 140, the hinge module 180, and the display support module 200 in FIGS. 10 and 11 may be wholly or partially the same as those of the hinge cover 140, the hinge module 180, and the display support module 200 in FIG. 5 and/or FIG. 6.

According to an embodiment, the display support module 200 may include the case structure 230. The case structure 230 may include a recess 234 to accommodate at least a portion of the deformation member 250 therein. According to an embodiment, the recess 234 may be located in the third area 233 of the case structure 230. For example, the recess 234 may be interpreted as a groove or empty space formed in a portion (e.g., the second support surface 233*a* in FIG. 6) of the third area 233.

According to an embodiment, the display support module 200 may include the deformation member 250 that includes a metal member 270. According to an embodiment, the metal member 270 may be bimetallic. For example, the metal member 270 may include a plurality of layers formed of different materials. According to an embodiment, the metal member 270 may include a first layer 271 having a first expansion rate and a second layer 272 having a second expansion rate different from the first expansion rate. According to an embodiment, the first layer 271 may be disposed on the case structure 230 of the display support module 200, and the second layer 272 may be disposed on the first layer 271.

According to an embodiment, the deformation member 250 may include the cushioning member 251 disposed on the metal member 270. The second layer 272 may be disposed between the first layer 271 and the cushioning member 251. According to an embodiment, the metal member 270 may be connected to the cushioning member 251. According to an embodiment, the shape of the cushioning member 251 may be deformed based on the deformation of the shape of the metal member 270. According to an embodiment, the metal member 270 may include at least one of nickel, iron, manganese, molybdenum, or copper. According to an embodiment, the cushioning member 251 may include rubber.

Figure 12:
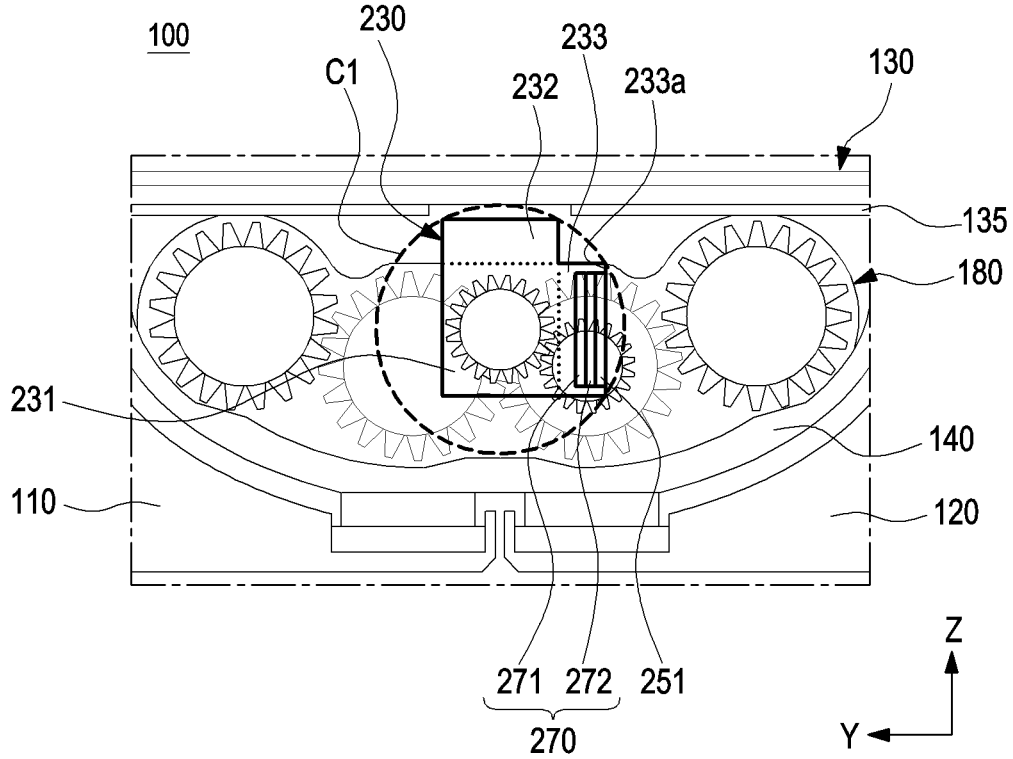
FIG. 12 is a cross-sectional view illustrating an electronic device including a metal member in an unfolded state according to an embodiment of the disclosure.

FIG. 12 is a cross-sectional view illustrating an electronic device including a metal member in an unfolded state according to an embodiment of the disclosure.

Figure 13:
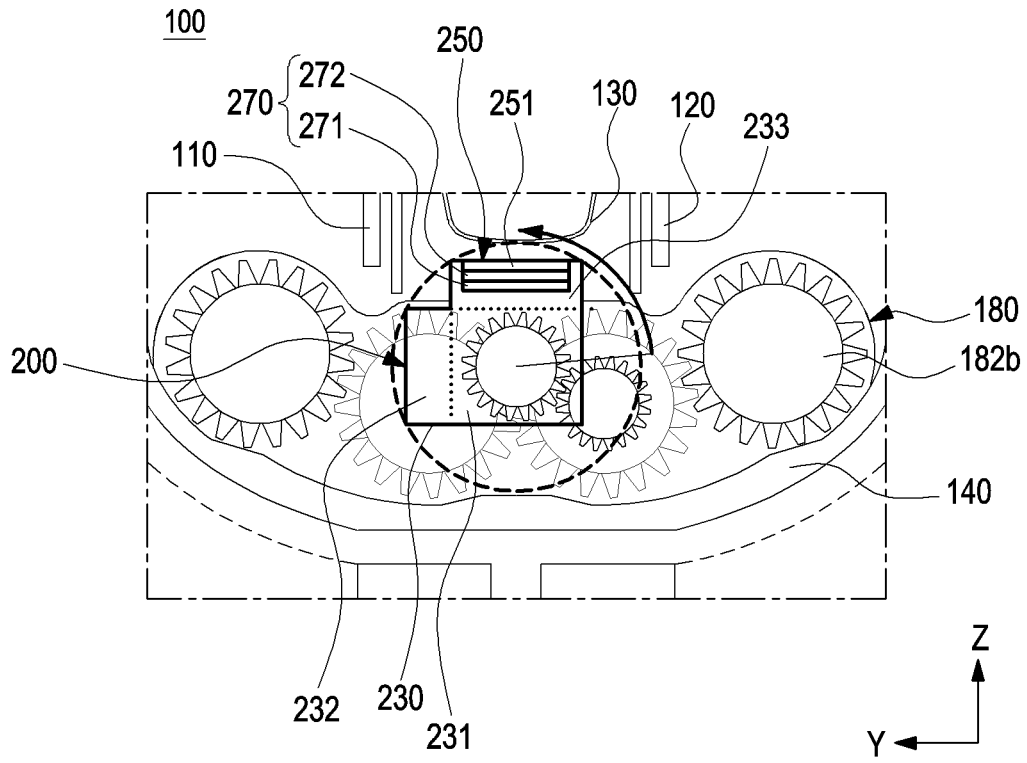
FIGS. 13, 14, and 15 are cross-sectional views illustrating an electronic device including a metal member in a folded state according to various embodiments of the disclosure.
Figure 14:
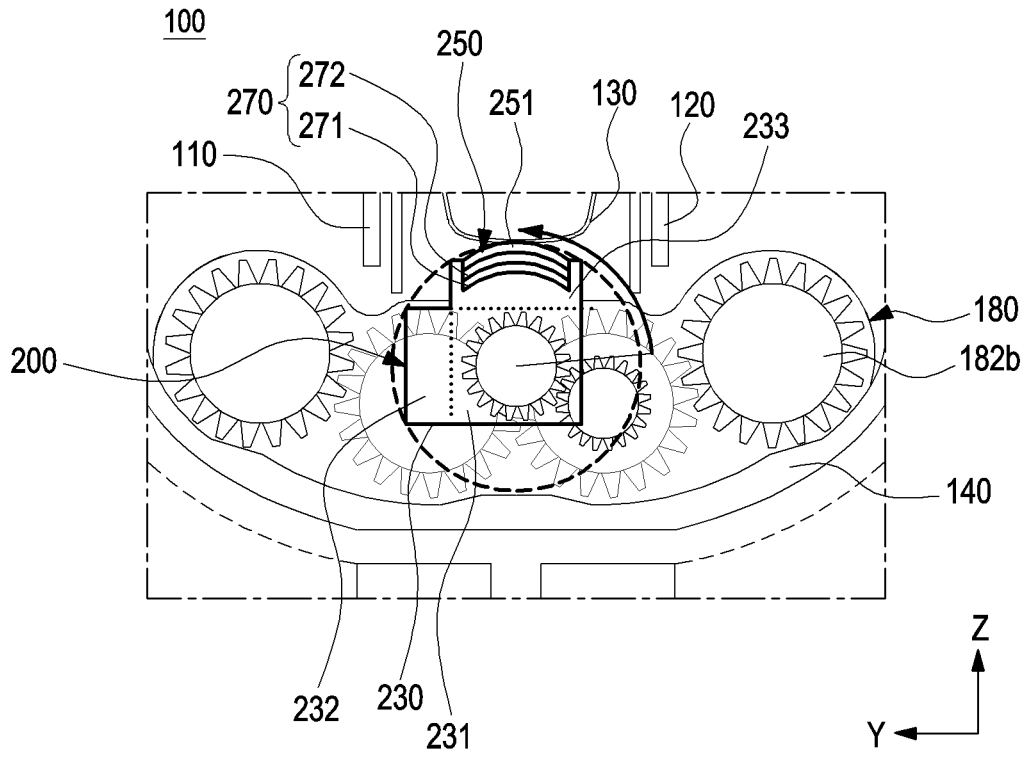
Figure 15:
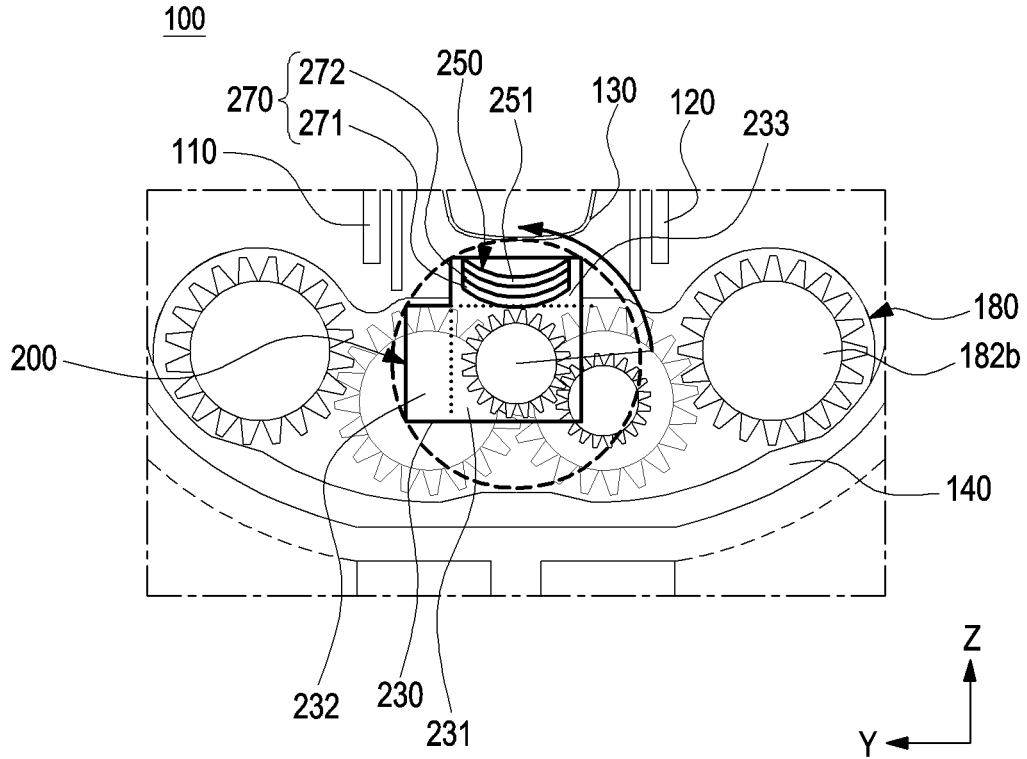

FIGS. 13 to 15 are cross-sectional views illustrating an electronic device including a metal member in a folded state according to various embodiments of the disclosure.

Referring to FIGS. 12 to 15, an electronic device 100 may include a first housing 110, a second housing 120, a display 130, a hinge cover 140, a hinge module 180, a display support module 200, and a display support plate 135. The configurations of the first housing 110, the second housing 120, the display 130, the hinge cover 140, the hinge module 180, the display support module 200, and the display support plate 135 in FIGS. 12 to 15 may be wholly or partially the same as those of the first housing 110, the second housing 120, the display 130, the hinge cover 140, the hinge module 180, the display support module 200, and the display support plate 135 in FIGS. 8 and 9.

According to an embodiment, the shape of the metal member 270 may be changed based on a temperature. For example, the shape of the metal member 270 may be changed to be flat, concave, or convex based on a temperature.

Referring to FIG. 14, when the temperature of an electronic device 100 is in a specified temperature range (e.g., a first temperature range), a metal member 270 may be deformed to be convex toward a display (e.g., the display 130 in FIG. 1). For example, in the first temperature range, the second expansion rate of the second layer 272 may be greater than the first expansion rate of the first layer 271. The first expansion rate or the second expansion rate may be interpreted as a coefficient of thermal expansion. The first temperature range may be interpreted as a low temperature state (e.g., −20° C. or below). According to an embodiment, the first layer 271 may be formed of at least one of nickel and/or iron, and the second layer 272 may be formed of at least one of nickel, manganese, molybdenum, or copper.

According to an embodiment, in the first temperature range, the deformation member 250 may deform the shape of the display 130. For example, as the metal member 270 is deformed to be convex toward the display 130, the cushioning member 251 located on the metal member 270 may be brought into contact with the display 130. The deformation member 250 may change the curvature of the display 130 using the bending of the metal member 270. For example, the display 130 may be provided with pressure by the cushioning member 251, and the curvature of the display 130 may be reduced by the cushioning member 251. According to an embodiment, as the deformation member 250 reduces the curvature of the display 130, breakage of the display 130 may be prevented or reduced in the first temperature range. For example, the flexibility of the display 130 may be reduced at a low temperature (e.g., below −20° C.). A curvature at which the display 130 is deformable without breakage at a low temperature may be less than a curvature at which the display 130 is deformable without breakage at a room temperature.

Referring to FIG. 13, when the temperature of an electronic device 100 is in a second temperature range higher than the first temperature range, a first layer 271 and a second layer 272 may be formed to be substantially flat. The second temperature range may be interpreted as a temperature range including the room temperature. According to an embodiment, the second temperature range may include 0° C. to 30° C.

Referring to FIG. 15, when the temperature of an electronic device 100 is in a third temperature range higher than the second temperature range, a metal member 270 may be deformed to be concave toward a display 130. According to an embodiment, the third temperature range may be interpreted as a temperature range exceeding 40° C.

An electronic device (e.g., a portable terminal) includes a display in a shape having a flat surface or flat and curved surfaces. The electronic device including the display may have limitations in realizing a screen larger than the size of the electronic device due to the fixed structure of the display. Therefore, foldable electronic devices are under research.

However, when the display is bent to or above a specified curvature, the display may be broken. Moreover, a curvature at which the display is deformable without breakage at a low temperature may be less than a curvature at which the display is deformable without breakage at a room temperature.

According to an embodiment of the disclosure, an electronic device may be provided, which may prevent or reduce breakage (e.g., peeling) of a display even at a low temperature by reducing the curvature of the display, when the electronic device is folded.

However, the problems addressed by the disclosure are not limited to the above-mentioned problems and may be expanded in various ways without departing from the spirit and scope of the disclosure.

An electronic device according to various embodiments of the disclosure may prevent or reduce breakage of a display by use of a display support member that may reduce the curvature of the display, when the electronic device is folded.

According to an embodiment of the disclosure, an electronic device (e.g., the electronic device 100 in FIG. 1) may include a housing (e.g., the housing 102 in FIG. 1) including a first housing (e.g., the first housing 110 in FIG. 1) and a second housing (e.g., the second housing 120 in FIG. 1), a display (e.g., the display 130 in FIG. 1) including a first display area (e.g., the first display area 131 in FIG. 1) connected to the first housing, a second display area (e.g., the second display area 132 in FIG. 1) connected to the second housing, and a folding area (e.g., the folding area 133 in FIG. 1) located between the first display area and the second display area, a hinge (e.g., the hinge module 180 in FIG. 4) connected to the first housing and the second housing, and a display support (e.g., the display support module 200 in FIG. 5) connected to the hinge and being configured to rotate based on a rotation of the hinge. The display support module may include a gear assembly (e.g., the gear assembly 210 in FIG. 5) connected to the hinge, a case structure (e.g., the case structure 230 in FIG. 6) including a first area (e.g., the first area 231 in FIG. 6), a second area (e.g., the second area 232 in FIG. 6), and a third area (e.g., the third area 233 in FIG. 6), the first area being connected to the gear assembly, the second area extending from the first area in a first direction (e.g., the first direction D1 in FIG. 6) and configured to face the folding area in an unfolded state of the electronic device, and the third area extending from the first area in a second direction (e.g., the second direction D2 in FIG. 6) different from the first direction and configured to face the folding area in a folded state of the electronic device, and a deformation member (e.g., the deformation member 250 in FIG. 6) disposed on the third area and being configured to contact the folding area.

In the disclosure, the gear assembly 210 is shown as including two gears (e.g., the first gear 211 and the second gear 212), which does not limit the structure of the gear assembly. For example, the gear assembly 210 may include four or more gears. In another example, the gear assembly 210 may include a belt structure or a cam structure.

According to an embodiment, the deformation member may include a metal member (e.g., the metal member 270 in FIG. 11) located between the cushioning member and the third area, and the metal member may include a first layer (e.g., the first layer in FIG. 14) and a second layer (e.g., the second layer 272 in FIG. 14) disposed on the third area and having a first expansion rate, and the second layer disposed between the first layer and the cushioning member and having a second expansion rate greater than the first expansion rate in a first temperature range.

According to an embodiment, the metal member may include at least one of nickel, iron, manganese, molybdenum, or copper.

According to an embodiment, the third area may include a recess (e.g., the recess 234 in FIG. 11) to accommodate at least a portion of the deformation member therein.

According to an embodiment, the electronic device may further include a display support plate (e.g., the display support plate 135 in FIG. 7) supporting at least a portion of the display and being disposed at least partially between the display and the hinge.

According to an embodiment, the display support plate may provide an accommodation space (e.g., the accommodation space 135c in FIG. 8) surrounding at least a portion of the display support.

According to an embodiment, the display support plate may include a first plate surface (e.g., the first plate surface 135a in FIG. 8) supporting the display, the display support may include a first support surface (e.g., first support surface 232a in FIG. 8) located at an end of the second area, and the first plate surface and the first support surface may parallel to each other in the unfolded state of the electronic device.

According to an embodiment, the gear assembly may include a first gear (e.g., the first gear 211 in FIG. 6) and a second gear (e.g., the second gear 212 in FIG. 6), the first gear being configured to rotate based on the rotation of the hinge, the second gear meshed with the first gear and connected to the first area.

According to an embodiment, the hinge may include a rotation structure (e.g., the rotation structure 181 in FIG. 4) including a first rotation member (e.g., the first rotation member 181a in FIG. 4) and a second rotation member (e.g., the second rotation member 181b in FIG. 4) being connected to the first housing and being configured to provide a first rotation axis (e.g., the first rotation axis Ax1), and the second rotation member connected to the second housing and being configured to provide a second rotation axis (e.g., the second rotation axis Ax2 in FIG. 4), and an interlocking structure (e.g., the interlocking structure 182 in FIG. 4) configured to interlock rotation of the first rotation member with the second rotation member.

According to an embodiment, at least a portion of the display support may be located between the first rotation axis and the second rotation axis.

According to an embodiment, the first rotation member may include a first hinge gear configured to rotate around the first rotation axis, the second rotation member may include a second hinge gear configured to rotate around the second rotation axis, the interlocking structure may include at least one interlocking gear (e.g., the first interlocking gear 182a, the second interlocking gear 182b, and/or the third interlocking gear 182c in FIG. 5) configured to rotate based on a rotation of the first hinge gear or the second hinge gear, and the gear assembly may be connected to the at least one interlocking gear.

According to an embodiment, the second area may include a first support surface (e.g., the first support surface 232a in FIG. 6) facing the display in the unfolded state of the electronic device, the third area may include a second support surface (e.g., the second support surface 232b in FIG. 6) facing the display and accommodating the deformation member in the folded state of the electronic device, and the first support surface and the second support surface may be perpendicular to each other.

According to an embodiment, the electronic device may further include a battery (e.g., the battery 150 in FIG. 3) which includes a first battery (e.g., the first battery 152 in FIG. 3) disposed within the first housing and a second battery (e.g., the second battery 154 in FIG. 3) disposed within the second housing, and an FPCB (e.g., the FPCB 170) at least partially crossing the hinge.

According to an embodiment, the deformation member may be configured to contact at least a portion of the display based on a temperature in the folded state of the electronic device.

According to an embodiment, an electronic device (e.g., the electronic device 100 in FIG. 1) may include a housing (e.g., the housing 102 in FIG. 1) including a first housing (e.g., the first housing 110 in FIG. 1) and a second housing (e.g., the second housing 120 in FIG. 1), a display (e.g., the display 130 in FIG. 1) including a first display area (e.g., the first display area 131 in FIG. 1) connected to the first housing, a second display area (e.g., the second display area 132 in FIG. 1) connected to the second housing, and a folding area (e.g., the folding area 133 in FIG. 1) located between the first display area and the second display area, a hinge (e.g., the hinge module 180 in FIG. 3) connected to the first housing and the second housing, and a display support (e.g., the display support module 200 in FIG. 6) connected to the hinge and configured to rotate based on rotation of the hinge. The display support may include a gear assembly (e.g., the gear assembly 210 in FIG. 6) connected to the hinge, a case structure (e.g., the case structure 230 in FIG. 6) including a first area (e.g., the first area 231 in FIG. 6) connected to the gear assembly, a second area (e.g., the second area 232 in FIG. 6) extending from the first area in a first direction (e.g., the first direction D1 in FIG. 6), and a third area (e.g., the third area 233 in FIG. 6) extending from the first area in a second direction (e.g., the second direction D2 in FIG. 6) different from the first direction, and a deformation member (e.g., the deformation member 250 in FIG. 11) disposed on the third area. The deformation member may include a cushioning member (e.g., the cushioning member 251 in FIG. 12) configured to face the folding area and a metal member (e.g., the metal member 270 in FIG. 11) disposed under the cushioning member.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing including a first housing and a second housing;
a display including a first display area connected to the first housing, a second display area connected to the second housing, and a folding area located between the first display area and the second display area;
a hinge comprising:
a first rotation structure connected to the first housing and configured to rotate with respect to a first rotation axis, and
a second rotation structure connected to the second housing and configured to rotate with respect to a second rotation axis; and
a display support connected to the hinge and being configured to rotate according to a rotation of the first rotation structure or the second rotation structure of the hinge with respect to a third rotation axis,
wherein the display support comprises:
a gear assembly connected to the hinge, and
a rotation body configured to rotate with respect to the third rotation axis, wherein the rotation body includes:
a first side being connected to the gear assembly,
a second side including a first support surface configured to face the folding area in an unfolded state of the electronic device, and
a third side, different from the second side, including a second support surface configured to support the folding area in a folded state of the electronic device.

2. The electronic device of claim 1,
wherein the display support further comprises a deformation member disposed on the second support surface of the third side,
wherein the deformation member is configured to contact the folding area in the folded state of the electronic device, and
wherein the deformation member includes a cushioning member.

3. The electronic device of claim 2,
wherein the deformation member includes a metal member connected to the cushioning member, and
wherein the metal member includes a first layer and a second layer, the first layer being disposed on the third side and having a first expansion rate, the second layer being disposed between the first layer and the cushioning member and having a second expansion rate greater than the first expansion rate in a first temperature range.

4. The electronic device of claim 3, wherein the metal member includes at least one of nickel, iron, manganese, molybdenum, or copper.

5. The electronic device of claim 2, wherein the third side includes a recess for accommodating at least a portion of the deformation member.

6. The electronic device of claim 1, further comprising:
a display support plate supporting at least a portion of the display and being at least partially disposed between the display and the hinge.

7. The electronic device of claim 6, wherein the display support plate provides an accommodation space surrounding at least a portion of the display support.

8. The electronic device of claim 6, wherein the display support plate includes a first plate surface supporting the display, wherein the display support further comprises a first support surface located at an end portion of the second side, and wherein the first plate surface and the first support surface are parallel to each other in the unfolded state of the electronic device.

9. The electronic device of claim 1, wherein the gear assembly includes a first gear and a second gear, the first gear being configured to rotate based on the rotation of the hinge, the second gear being meshed with the first gear and connected to the first side.

10. The electronic device of claim 1, wherein the hinge further comprises:

an interlocking structure configured to interlock rotation of the first rotation structure with the second rotation structure.

11. The electronic device of claim 10, wherein at least a portion of the display support is located between the first rotation axis and the second rotation axis.

12. The electronic device of claim 10, wherein the interlocking structure includes at least one interlocking gear configured to rotate according to the rotation of the first rotation structure or the second rotation structure, and wherein the gear assembly is connected to the at least one interlocking gear.

13. The electronic device of claim 1, further comprising: a hinge cover connected to the hinge, wherein the display support is disposed between the hinge cover and the folding area.

14. The electronic device of claim 2, wherein the second side includes the first support surface facing the display in the unfolded state of the electronic device, wherein the third side includes the second support surface facing the display and accommodating a deformation member in the folded state of the electronic device, and wherein the first support surface and the second support surface are perpendicular to each other.

15. The electronic device of claim 2, wherein the deformation member is configured to contact at least a portion of the display based on a temperature in the folded state of the electronic device.

* * * * *